United States Patent

Vargiu et al.

[15] 3,687,896

[45] Aug. 29, 1972

[54] PROCESS FOR THE CONTINUOUS MANUFACTURE OF PHENOL RESINS OF THE NOVOLAK TYPE

[72] Inventors: Silvio Vargiu, Ugo Nistri, both of Milan, Silvestro Pezzoli, Milan, all of Italy

[73] Assignee: Societa Italiana Resine S.P.A.

[22] Filed: Nov. 20, 1970

[21] Appl. No.: 91,574

[30] Foreign Application Priority Data

Dec. 23, 1969 Italy......................26198 A/69

[52] U.S. Cl...............260/57 A, 260/51 R, 260/53 R, 260/55
[51] Int. Cl. ..............................................C08g 5/06
[58] Field of Search ...........................260/57 A, 57 C

[56] References Cited

UNITED STATES PATENTS

| | | |
|---|---|---|
| 2,616,872 | 11/1952 | Bloem et al...............260/57 X |
| 2,674,589 | 4/1954 | Coleman et al...............260/57 |
| 2,927,097 | 5/1956 | Von Berg et al..............260/57 |
| 3,308,096 | 3/1967 | Ivanov et al. ............260/57 X |

FOREIGN PATENTS OR APPLICATIONS 1,089,936  11/1967  Great Britain

*Primary Examiner*—Howard E. Schain
*Attorney*—Sughrue, Rothwell, Mion, Zinn & Macpeak

[57] ABSTRACT

Phenol novolak resins of improved quality are made in elongated vertical reactors under particular reaction conditions, with agitation effected primarily in a direction at right angles to the vertical axis of the reactor.

7 Claims, No Drawings

PROCESS FOR THE CONTINUOUS MANUFACTURE OF PHENOL RESINS OF THE NOVOLAK TYPE

The present invention relates to a process of and apparatus for the continuous manufacture of phenol resins of the novolak type.

It is already well known that phenol resins of the novolak type are produced from a phenol and an aldehyde, normally phenol and formaldehyde in the presence of an acid catalyst, the molar ratio of aldehyde/phenol being less than 1.

In discontinuous processes, the phenol, the aldehyde and catalyst, in the desired proportions, are charged into a suitable reactor, after which the mixture is brought to a temperature of between 80° and 160° C. and these conditions are maintained until the quantity of free monomers present is reduced to a low level.

The resultant resin is then recovered from the products of condensation and granulated.

However, this procedure has those drawbacks inherent in discontinuous processes and due to the wastage of processing time and due to the possibility that, in different batches, products may result which have different characteristics, not to mention the large number of operators required.

For these reasons, attempts have been made to produce phenol resins of the novolak type in a continuous process, in other words by continuously supplying the reagents and continually discharging the novolak resins produced.

In fact, normally, a continuous process as compared with a discontinuous process affords a greater yield in a given time per unit of useful volume of reactor, a greater potential for automation of the plant and a greater constancy in the specifications of the product obtained.

Hitherto, however, many difficulties have prevented the perfection of advantageous processes for continuously manufacturing phenol reins of the novolak type.

In particular, while working with a molar ratio of formaldehyde: phenol of less than 1, products of condensation are obtained in which there is a certain amount of cross-linking, so reducing or sometimes even eliminating those features of thermoplasticity which are expected of phenol resins of the novolak type.

In any case, even under the most favorable conditions, the products obtained by prior art continuous processes have chemical-physical characteristics which are inferior to those of products which can be obtained by the usual intermittent methods.

One object of the present invention is to provide a process for the continuous manufacture of phenol resins of the novolak type which have high chemical-physical properties and which are substantially bereft of cross-linking.

A further object of the present invention is to provide a type of apparatus suitable for the manufacture of such resins. Other objects of the invention will become apparent from the following description.

The process which is the object of the present invention consists essentially in continuously supplying the phenol, the aldehyde and the acid catalyst to the head of an agitated reactor having a high ratio of length to diameter, and in carrying out the condensation reaction in an aqueous solution under controlled conditions of temperature and pressure, the reacting mass being kept within the limits of concentration which will be set out hereinafter.

The product of condensation containing the small quantities of unreacted monomers is then recovered at the foot of the reactor and subjected to water eliminating, drying and granulating treatments.

According to the process of the present invention, production of novolak phenol resins utilizes reactors of vertical elongated form, in other words reactors with a high ratio of length to diameter.

More particularly, this ratio is maintained at between 5:1 and 30:1.

For preference, cylindrical towers are used, at the head of which the reagents and catalyst are supplied, and the reaction mixture is then agitated as it flows to the base of the reactor.

The system and intensity of agitation have been found to be extremely important to the quality of the product.

Thus for example, when turbine agitators are used, particularly at a relatively high speed, of around 100 r.p.m., cross linked reaction products together with considerable quantities of non-reacted phenol are obtained, all other conditions being equal.

According to the process of the present invention, particularly satisfactory results are achieved when the mass in the reactor is agitated mainly in a direction at right-angles to the vertical axis through the reactor, such as for example by means of agitators with oriented blades or the like, an agitator speed of between 20 and 50 r.p.m. preferably being maintained.

These conditions result in sufficient homogenization of the products in the reactor, at the same time avoiding those undesirable phenomena due to an excessive agitation and remixing of the reaction mixture.

According to another fundamental aspect of the process of the present invention, the concentration of the reagent mixture in the aqueous phase is at all times maintained equal to or less than 75 percent by weight and is preferably comprised between 50 and 65 percent by weight.

The term concentration of the reagent mixture is understood to mean the sum of the concentrations of reagents at the moment of supply.

Indeed, it has been found that for concentrations in excess of those indicated, there are considerable drawbacks, particularly low levels of fluidity and a very high percentage of free phenol.

On the other hand, it is not preferred to work at concentrations below approx. 50 percent by weight due to the lesser yields and the losses of product due to solubilization. To maintain such concentrations, the quantity of water supplied with the reagents and reaction catalysts should be controlled. In order to obtain phenol resins of the novolak type, to the desired specifications, it is also essential to carry out condensation at temperatures of 120° to 150° C. in the upper part of the reactor so as to obtain less than 4.5 percent by weight of non-reacted formaldehyde in the reaction mixture.

Completion of reaction, in the lower part of the reactor, is carried out at temperatures between 95° and 130° C. In practice, working at the aforementioned concentrations makes it possible to regulate the conditions so as to maintain in the upper part of the reactor temperatures of between 120° and 150° C., by resorting to the exothermal properties of the condensation reaction.

In the bottom portion, it is normally necessary to carry off the heat of reaction so as to maintain the temperature within the desired limits.

In order to avoid boiling in the reagent mixture, the process of the present invention provides for the use of pressures above ambient pressure and preferably between 8 and 20 kg/sq.cm.

Under the conditions described, the base of the reactor yields a mixture having less than 10 percent by weight content of free phenol when the reaction times are maintained at between 8 and 18 minutes.

Then, from the product of reaction, the majority of the water is separated by decantation and the residue separated by distillation, preferably by means of the thin layer technique. Finally, the resin is granulated by normal processes.

According to the process of the present invention, in the manufacture of novolak type phenol resins, phenol is preferred although it is possible to use its derivatives such as for example the cresoles, xylenols, alkyl phenols and the aryl phenols.

Of the aldehyde compositions, formaldehyde is preferred, which may be used either in aqueous solution (formalin) or in the form of low molecular weight polymers (paraformaldehyde), or even substances which are capable of releasing formaldehyde under the conditions in which the process is conducted.

The supply to the reactor is also regulated so that the molar ratio of aldehyde:phenol is less than 1:1 and is preferably between 0.4:1 and 0.9:1.

The catalysts used in the condensation reaction may be the organic or inorganic acids which have a constant of acid dissociation or a constant of primary acid dissociation in the case of polybasic acids, of above approx. $1.7 \times 10^{-5}$. It is possible to use for the purpose maleic acid, formic acid, citric acid, acetic acid, hydrochloric acid, sulphuric acid, phosphoric acid and preferably oxalic acid.

The catalysts are preferably added, for the purposes of the present invention, in quantities of 0.1 to 5.0 percent by weight of the phenol compound supplied.

By proceeding in accordance with the process of the present invention, it is possible not only to enjoy the advantages deriving from a continuous process, but phenol resins of the fluid novolak type are obtained which are substantially free from products in the cross linked state, which have a low content of non-reacted monomers and which have characteristics which are constant in relation to time.

The significance of the present invention will now be illustrated in greater detail by the following examples, which do not however constitute any limitation on the invention itself.

EXAMPLE 1

A vertical elongated tubular reactor is used with a ratio of height:diameter equal to 12.1, equipped with a blade type of agitator capable of rotating at the speed of 30 r.p.m.

Into the top of the reactor, through three separate ducts, are supplied 90 percent phenol, 36 percent formaldehyde, 4 percent oxalic acid, so that the molar ratio of formaldehyde:phenol:oxalic acid is equal to 0.81:1:0.0086 while the concentration of the aqueous solution of the reagents in the reactor is equal to 58 percent by weight. The temperature of the reagents at introduction was equal to ambient levels. The reactor was also characterized by a pressure of 12 kg/sq.cm. while the temperature in its upper portion was between 130° and 150° C.

In the lower cooling zone, the temperature was maintained at between 95° and 110° C. by means of a heat exchanger fluid located in an outer jacket.

After a contact time of 13 minutes, a condensate was obtained which contained 5.7 percent free phenol and 3 percent free formaldehyde with no phenomena of remixing in the reaction medium.

After the water had been eliminated from the condensate, mostly be decantation and the residue by distillation through a mesh evaporator, a phenol resin of the novolak type was obtained which, when crushed, had a melting point range determined by the capillary method of 69° to 71° C. and a free phenol content equal to 2.5 percent.

A sample of this resin mixed with 8 percent hexamethylene tetramine had, at 150° C., a setting time of 140 secs. approx. and a fluidity, measured as the rate of flow at 125° C. over a plane inclined at 64°, of approx. 84 mm.

EXAMPLE 2

The procedure was carried out under the same conditions as in Example 1 but with a molar ratio of formaldehyde:phenol:oxalic acid of 0.86:1:0.0086. :

The result was a condensate containing 5.5 percent free phenol and 3.2 percent free formaldehyde.

After elimination of the water content, a thermoplastic phenol resin was obtained which, when ground, had a melting point range of 69° to 71° C., determined by the capillary method, and a free phenol content equal to 2.8 percent.

A sample of this resin, mixed with 8 percent hexamethylene tetramine had, at 150° C., a setting time of 130 secs. approx. and a fluidity of approx. 78 mm. measured as the amount of flow at 125° C. over an inclined plane of 64°.

EXAMPLE 3

The process was carried out under the same conditions as in Example 2, but with a concentration of aqueous solution of reagents in the reactor equal to 64 percent.

A condensate was obtained containing 5.9 percent free phenol and 3.1 percent free formaldehyde.

After elimination of the water content, a thermoplastic phenol resin was obtained which, when ground, had a melting range of 69° to 71° C., determined by the capillary method, and a free phenol content equal to 2.5 percent.

A sample of such resin, mixed with 8 percent hexamethylene tetramine, had a setting time at 150° C. of 134 seconds approx. and a fluidity of approx. 64 mm. measured as the amount of flow at 125° C. over an inclined plane at 64°.

EXAMPLE 4

The process was carried out under the same conditions as in Example 2 but with a concentration of aqueous solution of reagents in the reactor equal to 69 percent.

The result was a condensate containing 6.1 percent free phenol and 3.6 percent free formaldehyde.

After elimination of the water content, a thermoplastic phenol resin of the novolak type was obtained which, when ground, had a melting range, determined by the capillary method, of 70° to 72° C. and a free phenol content equal to 4 percent. A sample of such resin, mixed with 8 percent hexamethylene tetramine, had a setting time at 150° C. of 128 secs. approx. and a fluidity, determined by the usual method, of 53 mm.

EXAMPLE 5

Formaldehyde, phenol and oxalic acid were supplied to a reactor as in Example 1, but with a concentration of aqueous solution reagents equal to 64 percent.

The reactor was characterized by a pressure of 12 kg/sq.cm. and in its upper zone by a temperature comprised between 120 and 130° C., while in its lower cooling zone the temperature was maintained within the range of 100° to 120° C.

In addition, the reactor was provided with a turbine agitator which guaranteed a regular agitation equal to 100 r.p.m. After a contact time of 13 minutes, a condensate was obtained containing 19.3 percent free phenol and 7 percent free formaldehyde.

After elimination of water, a phenol resin was obtained with a free phenol content equal to 5.8 percent.

The sample of this resin, mixed with 8 percent hexamethylene tetramine had a setting time at 150° C. of 128 secs. approx. and a fluidity of approx. 56 mm. measured as the amount of flow over a 64° inclined plane at 125° C.

EXAMPLE 6

The process was carried out under the same conditions as in Example 5 but with a molar ratio of formaldehyde:phenol:oxalic acid equal to 0.86:1:0.0086.

A condensate was obtained containing 17 percent free phenol and 7.3 percent free formaldehyde.

After elimination of the water content, a phenol resin was obtained which, when ground, contained free phenol equal to 5.5 percent by weight.

A sample of this resin mixed with 8 percent hexamethylene tetramine had a setting time at 150° C. of 120 secs. approx. and a fluidity of approx. 40 mm.

EXAMPLE 7

The experiment was conducted intermittently in a reactor fitted with an agitator, to which phenol, formaldehyde and oxalic acid were supplied in such a way that the molar ratio equalled 0.86:1:0.0086 and the concentration of the aqueous solution of reagents in the reactor equalled 64 percent.

The mixture was heated to 100° C. and the temperature maintained at this level for 60 minutes. Then the temperature was raised to 160° C., the water being removed.

A condensate was obtained containing 8 percent free phenol and 6 percent free formaldehyde.

After elimination of the water, a phenol resin was obtained which, when ground, showed a melting range of 68° to 70° C. and a free phenol content equal to 5.3 percent.

A sample of this resin, mixed with 8 percent hexamethylene tetramine had at 150° C. a setting time of 128 secs. approx. and a fluidity of approx. 60 mm. measured as the rate of flow over a 64° inclined plane at 125° C.

What we claim is:

1. A process for the continuous manufacture of phenol resins of the novolak type, substantially free from cross-linking, which process comprises the steps of
   a. continuously supplying to the head of an elongated vertical reactor with a ratio of length:diameter ranging from 5:1 to 30:1, a phenol compound, an aldehyde, an acid catalyst and water, the molar ratio of said aldehyde to said phenol compound being less than 1:1 and the quantity of monomers being at most 75 percent, by weight, of the mixture supplied, said process being conducted at a temperature in the upper part of the reactor ranging from 120°–150° C. and in the bottom part of the reactor, where the reaction is completed, the temperature ranging between 95°–130° C., with the pressure in the reactor being maintained above atmospheric pressure and the dwell times ranging from 8 to 18 minutes, while the reaction mass is agitated mainly in a direction at right angles to the vertical axis through the reactor by means of blades, vertically oriented so as to stir the mass within the reactor in a direction normal to the vertical axis of the reactor, the stirrer being slowly rotated at a number of revolutions per minute ranging from 20 to 20 50,
   b. continuously discharging the products of the reaction at the base of the reactor,
   c. drying the product so obtained, and
   d. granulating the resultant product.

2. The process of claim 1, wherein said aldehyde and said phenol are supplied in a ratio of aldehyde-phenol between 0.4 and 0.9:1, the quantity of monomers being between 50 percent and 65 percent, percent by weight, in relation to the mixture supplied.

3. The process of claim 1, wherein the reactor pressures are maintained between 8 and 20 kg/sq. cm.

4. The process of claim 1, wherein said phenol compound is a member selected from the group consisting of cresoles, xylenols, aryl phenols, alkyl phenols and phenol per se.

5. The process of claim 1, wherein formaldehyde is employed as the aldehyde in the form of a member selected from the group consisting of an aqueous solution, polymers of low molecular weight, and substances capable of releasing formaldehyde under the conditions of the reaction.

6. The process of claim 1, wherein there is employed as reaction catalyst, a member selected from the group consisting of inorganic acids and organic acids, which have an acid dissociation constant, or a primary acid dissociation constant in the case of polybasic acid, greater than $1.7 \times 10^{-5}$ in quantities ranging from 0.1 percent to 5.0 percent by weight of the phenol compound supplied.

7. The process of claim 6, wherein said acid catalyst is a member selected from the group consisting of hydrochloric acid, sulfuric acid, phosphoric acid, maleic acid, formic acid, citric acid, acetic acid and oxalic acid.

* * * * *